(No Model.)
R. HUNT.
PROCESS OF REFINING FAT OILS.
No. 439,515. Patented Oct. 28, 1890.
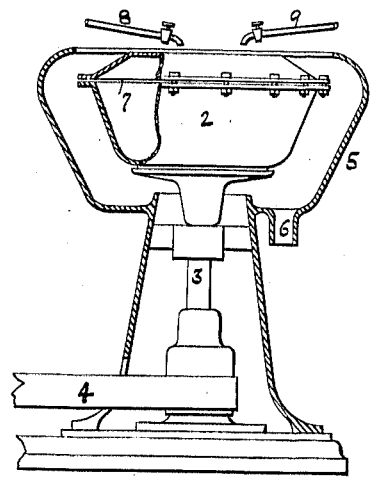
Witnesses
J. Johnson
Inventor
Richard Hunt

UNITED STATES PATENT OFFICE.

RICHARD HUNT, OF LIVERPOOL, ENGLAND.

PROCESS OF REFINING FAT OILS.

SPECIFICATION forming part of Letters Patent No. 439,515, dated October 28, 1890.

Application filed July 24, 1890. Serial No. 359,827. (No specimens.) Patented in England November 9, 1889, No. 17,870.

*To all whom it may concern:*

Be it known that I, RICHARD HUNT, a subject of the Queen of Great Britain, residing at Liverpool, in the county of Lancaster, England, have invented new and useful improvements in treating crude cotton-seed oil and oils containing resinous matter and free fatty acids to obtain oil-soap and resinous coloring-matter, (for which I have obtained provisional protection in Great Britain, No. 17,870, dated November 9, 1889;) and I do hereby declare the following to be a full, clear, and exact description thereof, reference being had to the accompanying drawing, which shows in vertical section apparatus which I may use in the practice of part of my invention.

The object of the invention is to treat cotton-seed and like oils in a simple and efficient manner, so as to obtain practically all the oil in a clear sweet condition, free from resinous matter, free from fatty acids and other impurities, and also to obtain the said fatty acids in the form of soap requiring little or no bleaching, and the resinous matter in a condition readily available for use as a pigment, dye, or coloring-matter.

Under my invention I first intimately and forcibly mix together crude oil and water at a temperature from 60° to 160° Fahrenheit. I find it is advantageous to use two parts of oil to one of water, and that the action required and the mixing are thoroughly effected by running the water and oil in two streams into a very rapidly-revolving basin contained within a vessel and having a narrow annular or horizontal slit or way, through which the oil and water are forcibly projected in thin films against the surface of the vessel. Other suitable forms of centrifugal machines may be used.

The machine above described, which is in common use for other purposes, is shown in the drawing, in which—

2 represents the revolving basin, which is rotated by a spindle 3, driven by a belt 4. The basin is formed with a peripheral slit 7, and is contained within an outer vessel 5, having an outlet-pipe 6. The oil and water are delivered into the basin through pipes 8 and 9, and when the basin is set in rapid rotation the mingled oil and water will be projected through the slit against the inside of the outer vessel 5.

When the oil and water are in about the proportions above stated, or when the water is in a greater ratio, I find it advantageous to allow the emulsive mixture to stand for some hours—say twelve or upward—and to drain off some of the water before treatment under the second part.

Second. I add to the emulsive mixture of oil and water from one-half of one per cent. to one and a half per cent. of caustic soda and about one per cent. of common salt—say from one-half to two and a half per cent.— and I agitate the mixture and raise the temperature to about 110° Fahrenheit—say not exceeding 160° Fahrenheit; or the temperature may be raised before the caustic soda and salt are added. I have found that such weak mixture of these two substances (common salt and soda) acts better than either substance alone in accomplishing the separation of the soap and coloring-matter from the oil. The mixture is then left to settle, after which the said oil is separated by decantation or otherwise from the chemical and precipitate.

Third. The oil is then mixed in the manner set forth under the first part with about half of its bulk, preferably with about one-third of its bulk, of a caustic-soda solution of from 4° to 5° Twaddle, containing from one-half of one per cent. to one per cent. of common salt, at a temperature of about 110° Fahrenheit to 125° Fahrenheit, and is afterward raised in temperature to, say, from 130° Fahrenheit to 160° Fahrenheit. The mixture is then allowed to settle, and the oil, which rises to the top, is decanted or otherwise removed from the chemical and precipitate. The said oil may be washed, if desired.

Fourth. From the chemical and precipitate under the second and third parts the soap is extracted by centrifugal action or by allowing the precipitate to settle in an ordinary settling-vat, in which the soap will rise to the top. After the soap has been removed, the residue contains the resinous coloring-matter. The caustic soda is not subjected to concentration before this separation is effected, but is used as weak as possible, so that it may not damage the products. Instead of caustic soda caustic potash or carbonates of soda and potash may be used in corresponding proportions to those above given.

Fifth. To obtain superior coloring-matter as regards purity and concentration the alkaline residue under the fourth part is filtered, and the filtrate, after the addition thereto of hydrochloric acid in excess, is heated until a precipitate is formed. The precipitated coloring-matter is carefully and quickly separated and washed, and is dissolved in as small a quantity as possible of an alkaline solution, preferably caustic potash. Instead of hydrochloric acid common salt may be used and the precipitate dissolved in water.

Having now particularly described and ascertained the nature of the said invention and in what manner the same is to be performed, I declare that what I claim is—

1. The method hereinbefore described of treating oils to obtain oil-soap and coloring-matter, which consists in intimately mixing the oil with water, adding caustic soda and common salt, agitating the mixture, raising the temperature thereof and then separating the oil from the precipitate, substantially as and for the purposes described.

2. The method herein described of treating oils to obtain oil-soap and coloring-matter, which consists in intimately mixing the oil with water, adding caustic soda and common salt, agitating the mixture, raising the temperature thereof and then separating the oil from the precipitate, then mixing the oil so obtained with a solution of caustic soda and common salt, again elevating the temperature and separating the oil from the precipitate, substantially as and for the purposes described.

3. The method hereinbefore described of treating oils to obtain oil-soap and coloring-matter, which consists in intimately mixing the oil with water, adding caustic soda and common salt, agitating the mixture, raising the temperature thereof, and then separating the oil from the precipitate and separating the soap from the residue, substantially as and for the purposes described.

RICHARD HUNT.

Witnesses:
 JAMES JOHNSON,
 W. B. JOHNSON.